United States Patent
Kowalkowski et al.

(10) Patent No.: US 8,707,677 B2
(45) Date of Patent: Apr. 29, 2014

(54) SYSTEM AND METHOD FOR CONTROLLING A NITROGEN OXIDE SENSOR

(75) Inventors: Janean E. Kowalkowski, Northville, MI (US); Scott T. Feldmann, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 598 days.

(21) Appl. No.: 13/012,897

(22) Filed: Jan. 25, 2011

(65) Prior Publication Data
US 2012/0117942 A1    May 17, 2012

Related U.S. Application Data

(60) Provisional application No. 61/412,864, filed on Nov. 12, 2010.

(51) Int. Cl.
*F01N 11/00* (2006.01)

(52) U.S. Cl.
USPC ............. 60/276; 60/273; 60/274; 60/277

(58) Field of Classification Search
USPC ............................................. 60/273
See application file for complete search history.

(56) References Cited

U.S. PATENT DOCUMENTS

| | | | | |
|---|---|---|---|---|
| 7,409,247 | B2* | 8/2008 | Daneau et al. | 700/48 |
| 8,397,489 | B2* | 3/2013 | Webb et al. | 60/285 |
| 2005/0282285 | A1* | 12/2005 | Radhamohan et al. | 436/55 |
| 2008/0103684 | A1* | 5/2008 | Allmer et al. | 701/114 |
| 2009/0049826 | A1* | 2/2009 | Toshioka et al. | 60/286 |
| 2010/0319316 | A1* | 12/2010 | Kasahara | 60/273 |
| 2011/0083422 | A1* | 4/2011 | Furness | 60/276 |
| 2011/0314792 | A1* | 12/2011 | Shibata et al. | 60/273 |

FOREIGN PATENT DOCUMENTS

JP    2009281952 A    12/2009

\* cited by examiner

*Primary Examiner* — Thomas Denion
*Assistant Examiner* — Todd Pleiness
(74) *Attorney, Agent, or Firm* — Quinn Law Group, PLLC

(57) ABSTRACT

A vehicle includes an engine having an exhaust port, an exhaust system for conditioning an engine exhaust stream, a nitrogen oxide (NOx) sensor positioned within the exhaust stream, and a controller. The controller has an out-of-range diagnostic tool for evaluating a range performance of the sensor. The controller detects a predetermined engine-on fuel shutoff event, and then temporarily disables the diagnostic tool during the fuel shutoff event. The fuel shutoff event may be a vehicle deceleration-based event. A selective catalytic reduction (SCR) device may be positioned within the exhaust system, with at least one NOx sensor positioned at the outlet of the SCR device. An additional NOx sensor may be positioned in proximity to the exhaust port. A method for use aboard the above vehicle includes detecting the engine-on fuel shutoff event via the controller, and temporarily disabling the diagnostic tool for the duration of the detected fuel shutoff event.

13 Claims, 1 Drawing Sheet

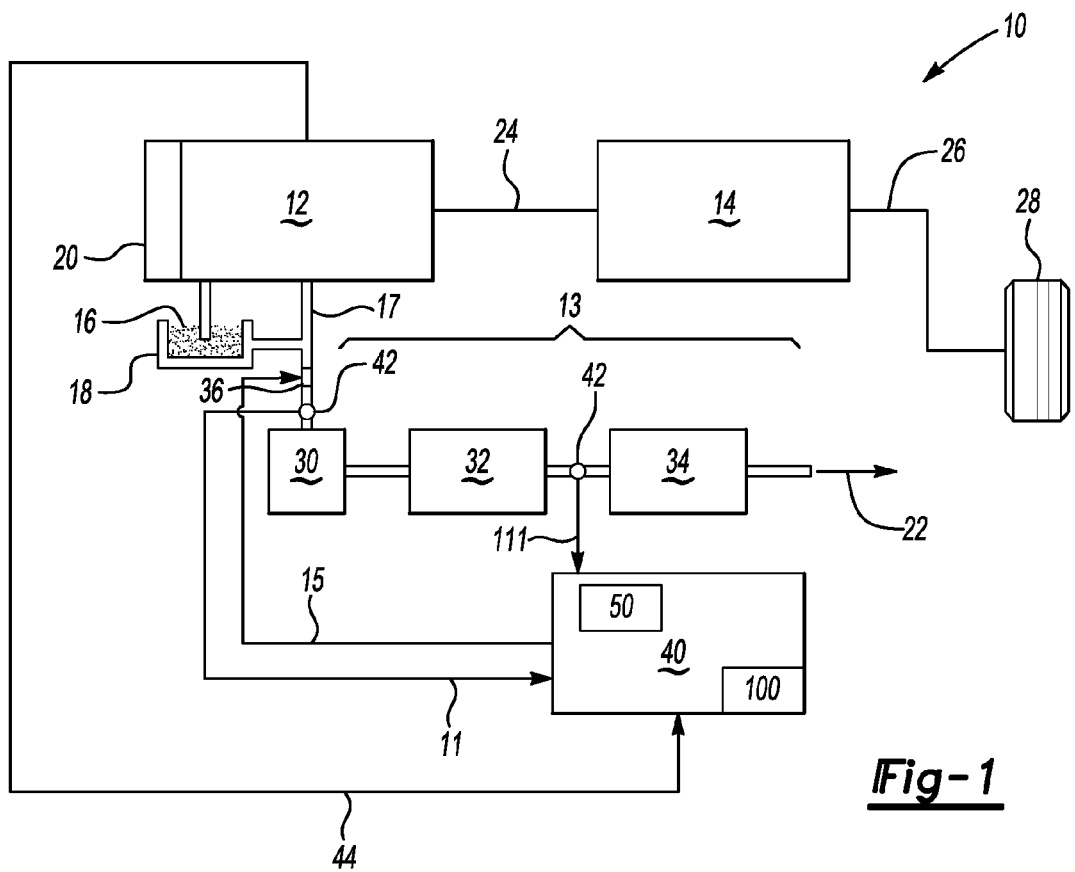
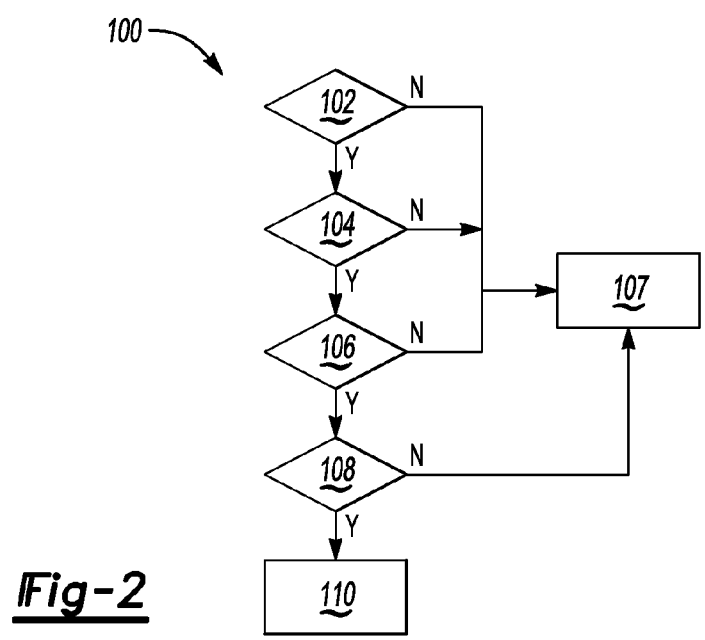

SYSTEM AND METHOD FOR CONTROLLING A NITROGEN OXIDE SENSOR

CROSS-REFERENCE TO RELATED APPLICATIONS

This application claims priority to and the benefit of U.S. Provisional Patent Application No. 61/412,864 filed on Nov. 12, 2010, which is hereby incorporated by reference in its entirety.

TECHNICAL FIELD

The present invention relates to a system and a method for controlling a nitrogen oxide (NOx) sensor of the type used in an engine exhaust system.

BACKGROUND

Spark-type and compression-type internal combustion engines generate several forms of nitrogen oxide (NOx) gasses as byproducts of the fuel combustion process. NOx gasses may be present in the engine exhaust stream in various forms, including nitric oxide (NO), nitrogen dioxide (NO$_2$), and nitrous oxide (N$_2$O). To reduce the levels of the various NOx gasses present in vehicle tailpipe emissions, modern vehicles may include a selective catalytic reduction (SCR) device.

Within the exhaust system, a suitable reductant such as ammonia or urea is added at a precisely controlled rate to the NOx-containing exhaust stream, and passed over the SCR device. The catalytic action of the SCR device converts the NOx gasses into nitrogen and water. NOx sensors are typically positioned within the exhaust stream to closely monitor NOx levels and SCR efficiency. The performance of these sensors may be evaluated using appropriate sensor diagnostic software.

SUMMARY

A vehicle is disclosed herein that includes an internal combustion engine. A fuel supply to the various engine cylinders is automatically reduced at times, e.g., when the vehicle is actively decelerating, in order to increase fuel efficiency. This capability is referred to herein as a fuel shutoff event. The vehicle includes one or more nitrogen oxide (NOx) sensors, and a controller having an out-of-range diagnostic tool. Additionally, the controller includes an algorithm for executing the present method, which selectively deactivates the diagnostic tool in response to the fuel shutoff event. Execution of the present algorithm temporarily prevents diagnosis of the functioning of the NOx sensor(s), and particularly the diagnosis of any out-of-range low NOx level conditions.

In particular, a vehicle is disclosed that includes an internal combustion engine having an exhaust port, an exhaust system in fluid communication with the exhaust port, a nitrogen oxide (NOx) sensor, and a controller. The exhaust system is configured to condition an exhaust stream as the exhaust stream passes through the exhaust system. The NOx sensor is positioned within the exhaust stream, and measures a NOx level in the exhaust stream. The controller has an out-of-range diagnostic tool, and selectively disables the diagnostic tool in response to a predetermined engine-on fuel shutoff event.

A method for use aboard the vehicle includes detecting a predetermined engine-on fuel shutoff event via the controller, and temporarily disabling an out-of-range diagnostic tool for the duration of the detected fuel shutoff event. The out-of-range diagnostic tool that is selectively disabled is configured for evaluating a range performance of the NOx sensor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a vehicle having nitrogen oxide (NOx) sensors; and FIG. 2 is a flow chart describing a method for selectively deactivating a NOx sensor diagnostic tool during a fuel shutoff event aboard the vehicle shown in FIG. 1.

DESCRIPTION

Referring to the drawings, wherein like reference numbers correspond to like or similar components throughout the several figures, a vehicle 10 is shown schematically in FIG. 1. The vehicle 10 includes an internal combustion engine 12, which may be a spark ignition-type gasoline engine or a compression-type diesel engine depending on the configuration. The vehicle 10 includes one or more nitrogen oxide (NOx) sensors 42, a controller 40, a sensor diagnostic tool 50, and a method or algorithm 100. The algorithm 100 may be selectively executed by associated hardware components of the controller 40 to selectively disable or temporarily deactivate the diagnostic tool 50 during a predetermined fuel shut off event occurring while the engine 12 is running.

One such fuel shut off event is a deceleration fuel shutoff event. In such an event, the injection of fuel 16 into the various cylinders of the engine 12 is turned off during periods of sustained vehicle deceleration. This action helps increase overall fuel efficiency. When the fuel feed rate to all cylinders drops to zero or to some minimal non-zero threshold during a fuel shut off event, the engine 12 no longer combusts the fuel 16, and therefore the engine no longer emits NOx gasses. At such times, the continued unimpeded use of sensor out-of-range logic by the diagnostic tool 50 may generate out-of-range low values, i.e., values that are determined to be too low relative to a calibrated threshold. False positive diagnostic codes may result, which in turn can lead to unnecessary warranty repairs. Execution of the algorithm 100 of FIG. 2 addresses this issue.

The vehicle 10 includes a transmission 14. A throttle 20 or other suitable device selectively admits a predetermined amount of air into the engine 12, with fuel injectors (not shown) admitting the fuel 16 from a tank 18 in conjunction with the air. Combustion of the fuel 16 by the engine 12 generates an exhaust stream (arrow 22), which is processed via an exhaust system 13 before being ultimately discharged into the surrounding atmosphere. Energy released by the combustion of fuel 16 produces torque on a rotatable input member 24 of the transmission 14. Torque from the engine 12 is transferred through the various gear sets, clutches, brakes, and interconnecting members (not shown) of the transmission 14 to a rotatable output member 26. Output torque from the transmission 14 is thus delivered to a set of drive wheels 28, only one of which is shown in FIG. 1 for simplicity.

The exhaust system 13 is in fluid communication with an exhaust port(s) 17 of the engine 12, such that the exhaust system receives and conditions the exhaust stream (arrow 22) after the exhaust stream is discharged from the various cylinders of the engine. Depending on the embodiment, the exhaust system 13 may include an oxidation catalyst 30, a selective catalytic reduction (SCR) device 32, and a particulate filter 34, in any desired order.

The particulate filter 34 may be configured as ceramic foam, metal mesh, pelletized alumina, or any other temperature and application-suitable material(s). A fuel injection device 36 is in electronic communication with the controller 40, and controlled via a set of control signals (arrow 15). The fuel injection device 36 is in fluid communication with the tank 18. The fuel injection device 36 selectively injects some of the fuel 16 into the oxidation catalyst 30 as determined by the controller 40. The injected fuel 16 is then burned in a controlled manner within the oxidation catalyst 30 to generate heat in levels sufficient for regenerating the particulate filter 34.

Still referring to FIG. 1, the SCR device 32 is configured to convert NOx gasses into water and nitrogen as inert byproducts of combustion using an active catalyst. For example, the SCR device 32 may be configured as a ceramic brick or a ceramic honeycomb structure, a plate structure, or any other suitable design. In one embodiment, a NOx sensor 42 is positioned upstream with respect to the SCR device 32, such as at the outlet of the engine 12. Another NOx sensor 42 is positioned downstream with respect to the SCR device 32, such as just before the particulate filter 34. NOx level measurements (arrows 11, 111) from the respective upstream and downstream NOx sensors 42 are fed into the controller 40. The controller 40 processes and evaluates the overall NOx reduction performance of the SCR device 32 and related components.

The controller 40 may be configured as a digital computer or microcomputer acting as a vehicle control module, and/or as a proportional-integral-derivative (PID) controller device having a microprocessor or central processing unit (CPU), read-only memory (ROM), random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. The algorithm 100 and any required reference calibrations are stored within or readily accessed by the controller 40 to provide the functions described below.

The controller 40 is also in communication with the engine 12, e.g., via an engine control module (ECM) (not shown), and receives feedback signals (arrow 44). The controller 40 may act as the ECM, and therefore the feedback signals (arrow 44) may be internally determined with respect to the controller. The feedback signals (arrow 44) identify the operating point of the engine 12, such as the present position of the throttle 20, the desired fuel injection rate, engine speed, accelerator pedal position, and/or requested engine torque. As noted above, the engine 12 does not create NOx emissions when the engine is not actively combusting the fuel 16. Therefore, in accordance with the present invention the controller 40 selectively and temporarily disables any NOx sensor out-of-range logic resident within the diagnostic tool 50 whenever the controller detects a predetermined deceleration-based or other fuel shut off event.

Referring to FIG. 2 in conjunction with the structure of the vehicle 10 shown in FIG. 1, the present algorithm 100 begins with step 102, wherein the controller 40 verifies that properly functioning communication channels are active with respect to the NOx sensors 42. For example, step 102 may entail an automatic handshake or other protocol steps suitable for determining whether a controlled area network (CAN) of the vehicle 10 is properly functioning. Step 102 is intended to confirm the absence of communications failures relative to the NOx sensors 42. The algorithm 100 proceeds to step 104 if communications channels are properly functioning. Otherwise, the algorithm 100 proceeds to step 107.

At step 104, the controller 40 verifies whether the engine 12 has been running for a calibrated length of time. In one embodiment, the controller 40 starts a timer, and determines when a calibrated period, e.g., approximately 20 seconds, has elapsed. However, other embodiments may be envisioned that use other calibrated time periods. If the engine 12 has run for the calibrated time period, the algorithm 100 proceeds to step 106. Otherwise, the algorithm 100 proceeds to step 107.

At step 106, the controller 40 checks the ready status of the NOx sensors 42, and thereby determines whether each NOx sensor is presently online and available to measure NOx levels in the exhaust stream (arrow 22). If the NOx sensors 42 are ready, the algorithm 100 proceeds to step 108. Otherwise, the algorithm proceeds to step 107.

At step 107, the controller 40 temporarily deactivates or disables the out-of-range logic of the diagnostic tool 50, particularly for low-level error detection. That is, when the engine 12 is not actively combusting fuel 16, continuing to evaluate the performance of the NOx sensors 42 via the diagnostic tool 50 may lead to false positive results. This can cause the NOx sensors 42 to severely undershoot during the fuel shut-off event. Step 107 may remain active until the engine 12 is again fueled for a calibrated length of time, at which point the diagnostic tool 50 is released to monitor out-of-range functionality of the NOx sensors 42.

At step 108, the controller 40 determines the fuel feed rate into the various cylinders of the engine 12, and thereby determines whether the predetermined fuel shut off event is presently active. As explained above, the vehicle 10 may selectively defuel the engine 12, e.g., during periods of sustained deceleration, in order to conserve fuel. Step 108 verifies that such a fuel shut event is active. To do so, the controller 40 may communicate with an ECM (not shown), other control module, or directly with the engine 12, depending on the configuration, in order to precisely determine the fueling rate.

The controller 40 then compares the known fueling rate to a calibrated low threshold, which should be substantially zero or some low non-zero threshold. In one embodiment, the controller 40 may use a threshold of approximately 0 to approximately 8 $mm^3$ of fuel 16 per revolution of the engine 12, although other fueling values may be used. Alternately, step 108 may entail comparing the runtime of the engine 12 to a second calibrated threshold that is higher than the first calibrated threshold from step 104. For example, the controller 40 may use a threshold of approximately 600 seconds, and may execute step 110 whenever the engine 12 has run for at least that long, regardless of fueling rate. The algorithm 100 proceeds to step 110 if the fueling rate exceeds the calibrated threshold or the runtime exceeds the second calibrated threshold. Otherwise, the algorithm 100 proceeds to step 107.

At step 110, the controller 40 executes the diagnostic tool 50 in the usual manner. That is, at step 110 the controller 40 performs out-of-range diagnostics by processing the NOx levels (arrows 11, 111) and comparing these levels to calibrated thresholds. Diagnostic codes, indicator lamps, messages, or other suitable control actions may be executed by the controller 40 when NOx levels are low or high relative to the thresholds.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an internal combustion engine having an exhaust port;
   an exhaust system in fluid communication with the exhaust port, and configured to condition an exhaust stream from the engine;
   a nitrogen oxide (NOx) sensor positioned within the exhaust system, wherein the NOx sensor is configured to measure a level of NOx gasses in the exhaust stream; and
   a controller having an out-of-range diagnostic tool for evaluating a range performance of the NOx sensor;
   wherein the controller is configured to:
      determine a runtime of the engine;
      compare the runtime of the engine to a first calibrated runtime threshold;
      detect a predetermined engine-on fuel shutoff event; and
      temporarily disable the out-of-range diagnostic tool during the predetermined engine-on fuel shutoff event until the runtime of the engine exceeds the first calibrated runtime threshold.

2. The vehicle of claim 1, wherein the out-of-range diagnostic tool determines when the level of NOx gasses in the exhaust stream falls below a minimum threshold, and wherein the predetermined engine-on fuel shutoff event is a vehicle deceleration-based fuel shut off event.

3. The vehicle of claim 1, further comprising:
   a selective catalytic reduction (SCR) device positioned within the exhaust system, wherein the SCR device is configured to reduce the NOx gasses to nitrogen and water via a catalytic process, wherein the NOx sensor is positioned at the outlet of the SCR device.

4. The vehicle of claim 3, wherein the NOx sensor includes the NOx sensor positioned at the outlet of the SCR device, and further includes an additional NOx sensor positioned in proximity to the exhaust port of the engine.

5. The vehicle of claim 1, wherein the controller detects the predetermined engine-on fuel shutoff event in part by determining a fuel feed rate into the engine, and by comparing the fuel feed rate to a calibrated fuel feed rate threshold.

6. The vehicle of claim 1, wherein the controller is further configured to:
   compare the runtime of the engine to a second calibrated runtime threshold that is greater than the first calibrated runtime threshold; and
   enable the out-of-range diagnostic tool whenever the runtime of the engine exceeds the second calibrated runtime threshold.

7. A method for use aboard a vehicle having an internal combustion engine, an exhaust system in fluid communication with the engine, a nitrogen oxide (NOx) sensor positioned within the exhaust system, and a controller, the method comprising:
   detecting a runtime of the engine via the controller;
   comparing the runtime of the engine to a first calibrated runtime threshold;
   detecting a predetermined engine-on fuel shutoff event via the controller; and
   temporarily disabling an out-of-range diagnostic tool during the detected fuel shutoff event until the runtime of the engine exceeds the first calibrated runtime threshold;
   wherein the out-of-range diagnostic tool is configured for evaluating a range performance of the NOx sensor.

8. The method of claim 7, wherein detecting a predetermined engine-on fuel shutoff event includes determining a fuel feed rate via the controller, and comparing the determined fuel injection rate to a calibrated fuel feed rate threshold.

9. The method of claim 7, wherein the calibrated fuel feed rate threshold is approximately 0 $mm^3$ to approximately 8 $mm^3$ of fuel per revolution of the engine.

10. The method of claim 7, wherein detecting a predetermined engine-on fuel shutoff event includes detecting a vehicle deceleration-based fuel shutoff event.

11. The method of claim 7, further comprising:
    comparing the runtime of the engine to a second calibrated runtime threshold that is greater than the first calibrated runtime threshold; and
    enabling the out-of-range diagnostic tool whenever the runtime of the engine exceeds the second calibrated runtime threshold.

12. A method for use aboard a vehicle having an internal combustion engine, an exhaust system in fluid communication with the engine, a nitrogen oxide (NOx) sensor positioned within the exhaust system, and a controller, the method comprising:
    detecting, via the controller, a predetermined engine-on fuel shutoff event via the controller, including detecting a vehicle deceleration-based fuel shutoff event by determining a fuel feed rate, and comparing the fuel injection rate to a calibrated threshold of approximately 0 $mm^3$ to approximately 8 $mm^3$ of fuel per revolution of the engine;
    temporarily disabling an out-of-range diagnostic tool for the duration of the detected fuel shutoff event, wherein the out-of-range diagnostic tool is configured for evaluating a range performance of the NOx sensor;
    detecting a runtime of the engine;
    comparing the runtime of the engine to a first calibrated runtime threshold; and
    temporarily disabling the out-of-range diagnostic tool only until the runtime of the engine exceeds the first calibrated runtime threshold.

13. The method of claim 12, further comprising:
    comparing the runtime of the engine to a second calibrated runtime threshold that is greater than the first calibrated runtime threshold; and
    enabling the out-of-range diagnostic tool whenever the runtime of the engine exceeds the second calibrated runtime threshold.

* * * * *